US012756664B2

(12) United States Patent
Zhang et al.

(10) Patent No.: US 12,756,664 B2
(45) Date of Patent: Oct. 6, 2026

(54) ADVERTISING NON-VPN ROUTES WITH A ROUTE DISTINGUISHER AND A ROUTE TARGET

(71) Applicant: Juniper Networks, Inc., Sunnyvale, CA (US)

(72) Inventors: Zhaohui Zhang, Westford, MA (US); Kevin Wang, Acton, MA (US); Srihari Ramachandra Sangli, Bengaluru (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 731 days.

(21) Appl. No.: 18/077,858

(22) Filed: Dec. 8, 2022

(65) Prior Publication Data

US 2024/0031285 A1 Jan. 25, 2024

(30) Foreign Application Priority Data

Jul. 25, 2022 (IN) ............................. 202241042358

(51) Int. Cl.
*H04L 45/745* (2022.01)
*H04L 45/02* (2022.01)

(52) U.S. Cl.
CPC ............ *H04L 45/745* (2013.01); *H04L 45/02* (2013.01)

(58) Field of Classification Search
CPC .............................. H04L 45/745; H04L 45/02
USPC .......................................................... 370/392
See application file for complete search history.

(56) References Cited

U.S. PATENT DOCUMENTS

| | | | | |
|---|---|---|---|---|
| 2007/0230746 A1* | 10/2007 | Takeda | G08G 1/167 | 382/104 |
| 2008/0198859 A1* | 8/2008 | Elias | H04L 45/124 | 370/392 |
| 2017/0289216 A1* | 10/2017 | N | H04L 45/22 | |
| 2020/0389507 A1* | 12/2020 | Mudric | H04L 43/0811 | |
| 2021/0176165 A1* | 6/2021 | Vairavakkalai | G06F 16/2379 | |

OTHER PUBLICATIONS

E. Rosen, et al.; "BGP/MPLS IP Virtual Private Networks (VPNs)"; Feb. 2006, pp. 1-47; RFC 4364, DOI 10.17487/RFC4364; Network Working Group; Standards Track; The Internet Society; https://www.rfc-editor.org/info/rfc4364.

J. De Clercq, et al.; "BGP-MPLS IP Virtual Private Network (VPN) Extension for IPv6 VPN"; Sep. 2006; pp. 1-18; RFC 4659, DOI 10.17487/RFC4659; Network Working Group; Standards Track; The Internet Society; https://www.rfc-editor.org/info/rfc4659.

R. Aggarwal, et al.; "BGP Encodings and Procedures for Multicast in MPLS/BGP IP VPNs"; Feb. 2012; pp. 1-59; RFC 6514, DOI 10.17487/RFC6514; Internet Engineering Task Force (IETF); Standards Track; https://www.rfc-editor.org/info/rfc6514.

(Continued)

Primary Examiner — Hermon Asres
(74) *Attorney, Agent, or Firm* — Harrity & Harrity, LLP

(57) ABSTRACT

In some implementations, a first network device may determine a route distinguisher (RD) and a route target (RT) associated with an address prefix that is to be included in a global routing and forwarding table. The first network device may send an advertisement that includes the address prefix, the RD, and the RT, wherein: the RT indicates that the address prefix is to be included in a global routing and forwarding table of a receiving network device.

20 Claims, 8 Drawing Sheets

(56) References Cited

OTHER PUBLICATIONS

J. Zhang, et al.; "Global Table Multicast with BGP Multicast VPN (BGP-MVPN) Procedures"; Dec. 2015; pp. 1-22; RFC 7716, DOI 10.17487/RFC7716; Internet Engineering Task Force (IETF); Standards Track; https://www.rfc-editor.org/info/rfc7716.

D. Walton, et al., "Advertisement of Multiple Paths in BGP"; Jul. 2016; pp. 1-8; RFC 7911, DOI 10.17487/RFC7911; Internet Engineering Task Force (IETF); Standards Track; https://www.rfc-editor.org/info/rfc7911.

T. Morin, et al., "Multicast VPN Fast Upstream Failover"; Apr. 2021; pp. 1-22; RFC 9026, DOI 10.17487/RFC9026; Internet Engineering Task Force (IETF); Standards Track;https://www.rfc-editor.org/info/rfc9026.

* cited by examiner

ADVERTISING NON-VPN ROUTES WITH A ROUTE DISTINGUISHER AND A ROUTE TARGET

CROSS-REFERENCE TO RELATED APPLICATION

This application claims priority to Indian Patent Application No. 202241042358, entitled "USING VPN-IP ADDRESS FAMILY FOR NON-VPN ROUTES," and filed on Jul. 25, 2022. The entire content of the above-referenced application is expressly incorporated herein by reference.

BACKGROUND

A network device, such as a provider edge (PE) network device, can include a global routing and forwarding table and one or more virtual routing and forwarding tables (VRFs). Each VRF can be associated with a virtual private network (VPN). Accordingly, the network device can support routing non-VPN traffic (e.g., using the global routing and forwarding table) and VPN traffic (e.g., using the one or more VRFs), even in scenarios of overlapping addresses.

SUMMARY

In some implementations, a method includes determining, by a first network device, a route distinguisher (RD) and a route target (RT) associated with an address prefix that is to be included in a global routing and forwarding table; and sending, by the first network device, an advertisement that includes the address prefix, the RD, and the RT, wherein: the RT indicates that the address prefix is to be included in a global routing and forwarding table of a receiving network device.

In some implementations, a non-transitory computer-readable medium storing a set of instructions includes one or more instructions that, when executed by one or more processors of a network device, cause the network device to: receive an advertisement that includes an address prefix, an RD, and an RT, wherein: the RT indicates that the address prefix is to be included in a global routing and forwarding table of the network device; and determine, based on the RT, that the address prefix is to be stored in the global routing and forwarding table of the network device.

In some implementations, a first network device includes one or more memories; and one or more processors to: send, to a second network device, an advertisement that includes an RD and an RT, wherein: the RT indicates that an address prefix of the advertisement is to be included in a global routing and forwarding table of the second network device.

DETAILED DESCRIPTION

Figure 1A:
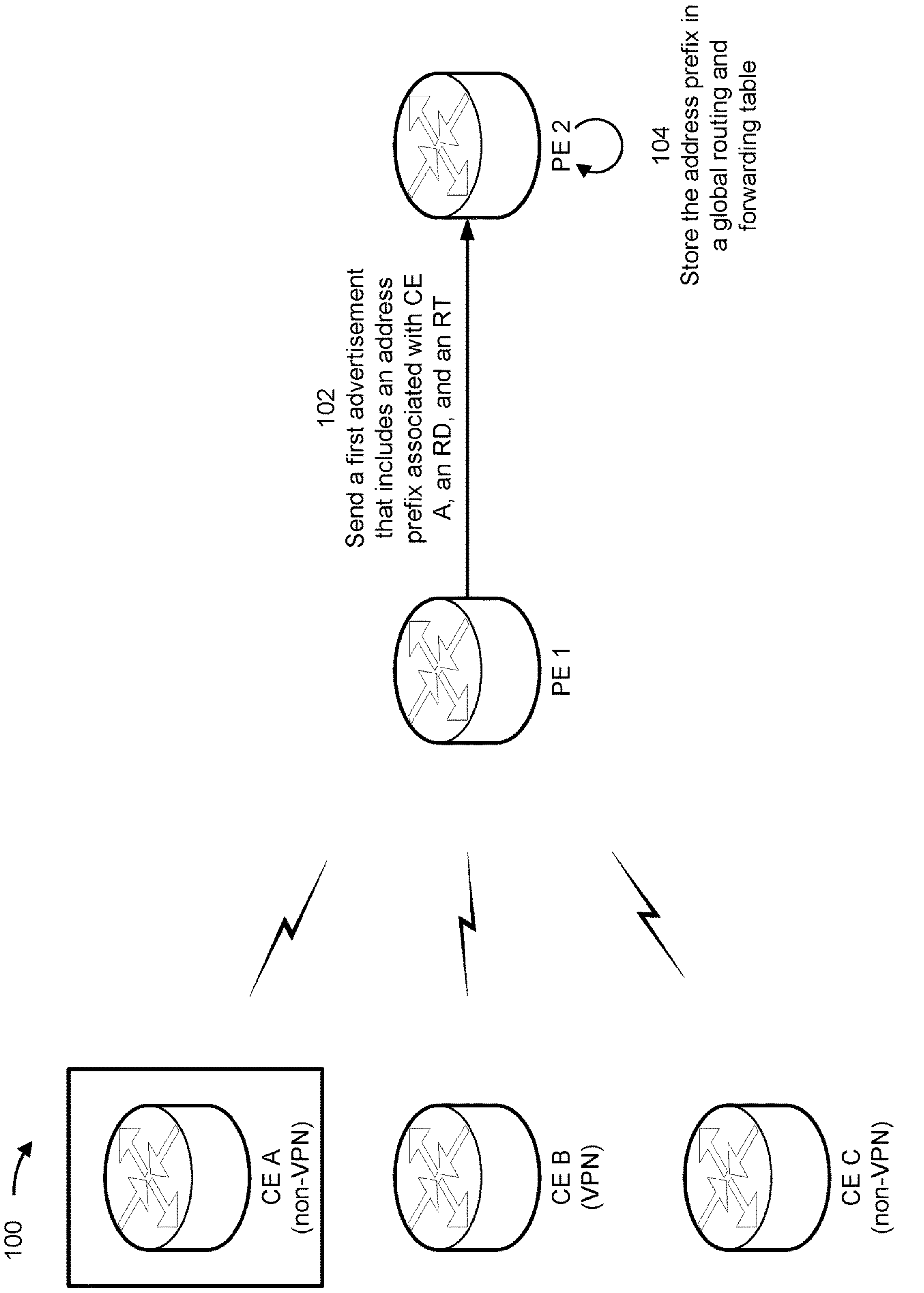
FIGS. 1A-1C are diagrams of one or more example implementations described herein.

The following detailed description of example implementations refers to the accompanying drawings. The same reference numbers in different drawings may identify the same or similar elements.

In many cases, an advertising network device (e.g., a PE network device) advertises a route associated with another network device (e.g., a customer edge (CE) network device) by sending an advertisement to a receiving network device (e.g., another PE network device). The advertisement typically includes an address prefix associated with the other network device. When the other network device is associated with a VPN, the advertisement may additionally include an RD and an RT to distinguish overlapping route prefixes and to control distribution and importation of route prefixes to a VRF (e.g., that is associated with the VPN) of the receiving network device. When the other network device is not associated with a VPN, the advertisement may include only the address prefix, which is imported into a global routing and forwarding table of the receiving network device. Accordingly, information that can distinguish different paths for non-VPN traffic to or from the receiving network device is not conveyed to the receiving network device via the advertisement.

This prevents the use of a single forward selection (SFS) functionality for global table multicast (GTM) (e.g., that uses border gateway protocol (BGP) multicast virtual private network (MVPN) procedures associated with the global routing and forwarding table). Further, MVPN fast failover procedures cannot be used for GTM (e.g., because egress PE network devices cannot originate different C-multicast A-D routes targeted at redundant ingress PE network devices). Consequently, a receiving network device (e.g., a PE network device) is not able to provide as robust and efficient a functionality for non-VPN traffic as it is able to provide for VPN traffic. This results in the receiving network device (as well as other PE network devices) not providing a desired routing performance for non-VPN traffic and/or utilizing computing resources (e.g., processing resources, memory resources, communication resources, and/or power resources, among other examples) to perform other routing processes and techniques to provide workarounds of the SFS functionality and MVPN fast failover procedures. Moreover, in a unicast only context, multiple paths to a CE network device for non-VPN traffic can be advertised, which often results in multiple copies of the same path being stored in global routing and forwarding tables of PE network devices. This causes further consumption of computing resources of the PE network devices.

Some implementations described herein are directed to a first PE network device sending a first advertisement to a second PE network device. The first advertisement includes a non-VPN address prefix (e.g., associated with a CE device or another device), an RD, and an RT. The second PE network device determines that the address prefix is not a VPN address prefix (e.g., based on the RT) and therefore stores the address prefix in a global routing and forwarding table (rather than a virtual routing and forwarding table for a VPN). Further, the first PE network device may send a second advertisement to the second PE network device that includes a VPN address prefix (e.g., associated with a same, or different, CE device that is associated with a VPN), an RD, and an RT. The second PE network device determines that the address prefix is a VPN address prefix (e.g., based on the RT) and therefore stores the address prefix in a virtual routing and forwarding table (e.g., that is associated with the VPN). Additionally, the first PE network device may send a third advertisement to the second PE network device that includes only a non-VPN address prefix (e.g., without an RD and an RT). The second PE network device determines that the address prefix is not a VPN address prefix (e.g., based on the third advertisement not including an RD and an RT) and therefore stores the address prefix in the global routing and forwarding table.

In this way, the first PE network device is able to advertise, to the second PE network device via the first advertisement, information that can distinguish different paths for non-VPN traffic to or from the second PE network device. This enables the use of the SFS for GTM by the second PE network device, as well as other PE network devices that receive the first advertisement. This also enables use of MVPN fast failover procedures by the second PE network device and the other PE network devices (e.g., because egress PE network devices are able to originate different C-multicast A-D routes targeted at redundant ingress PE network devices). Therefore, the second PE network device and the other PE network devices are able to provide a robust and efficient functionality for non-VPN traffic (e.g., that is the same as, or similar to, that provided for VPN traffic). Accordingly, the second PE network device, and the other PE network devices, provide a desired routing performance for non-VPN traffic and therefore consumption of computing resources (e.g., processing resources, memory resources, communication resources, and/or power resources, among other examples) to perform other routing processes and techniques (e.g., to provide workarounds of the SFS functionality and MVPN fast failover procedures) is reduced or eliminated. Further, in a unicast-only context, a need to advertise multiple paths to a CE network device is reduced or eliminated, which further reduces utilization of computing resources that would otherwise be used to generate and maintain copies of the multiple paths.

Additionally, the first PE network device is able to advertise multiple types of advertisements (e.g., two different types of non-VPN advertisements and another type of VPN advertisement), and the second PE network device is able to receive and process the multiple types of advertisements (e.g., by storing information in a particular type of advertisement in a routing and forwarding table that corresponds to the particular type). In this way, the first PE network device and the second PE network device are each able to provide functionalities that are not otherwise able to be provided by typical PE network devices. Accordingly, the first PE network device and the second PE network device are able to provide improved advertising, routing, and other networking performances (e.g., related to SFS for GTM, MVPN fast failover procedures, and/or other procedures) that cannot otherwise be provided by typical PE network devices.

Figure 1B:
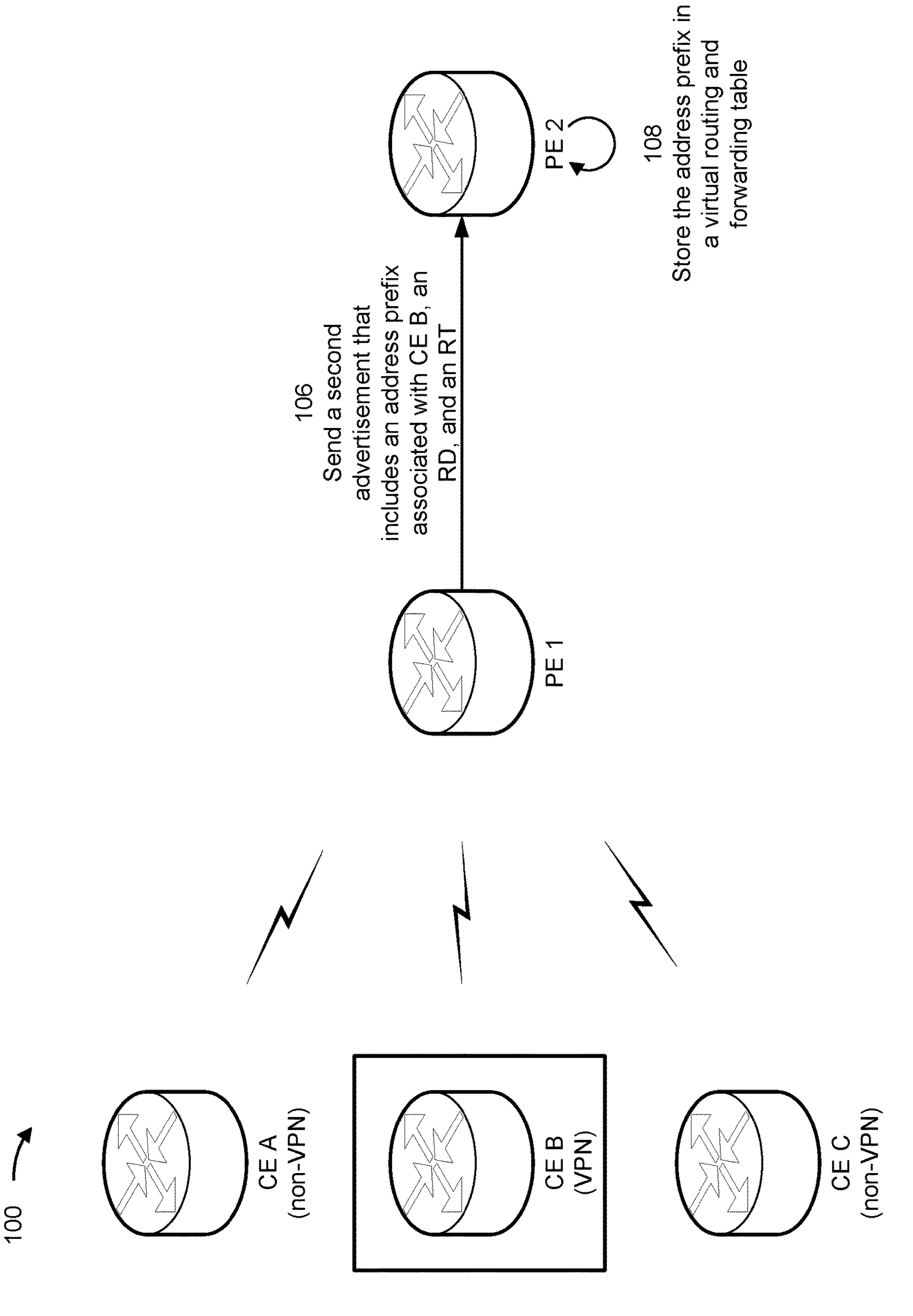
Figure 1C:
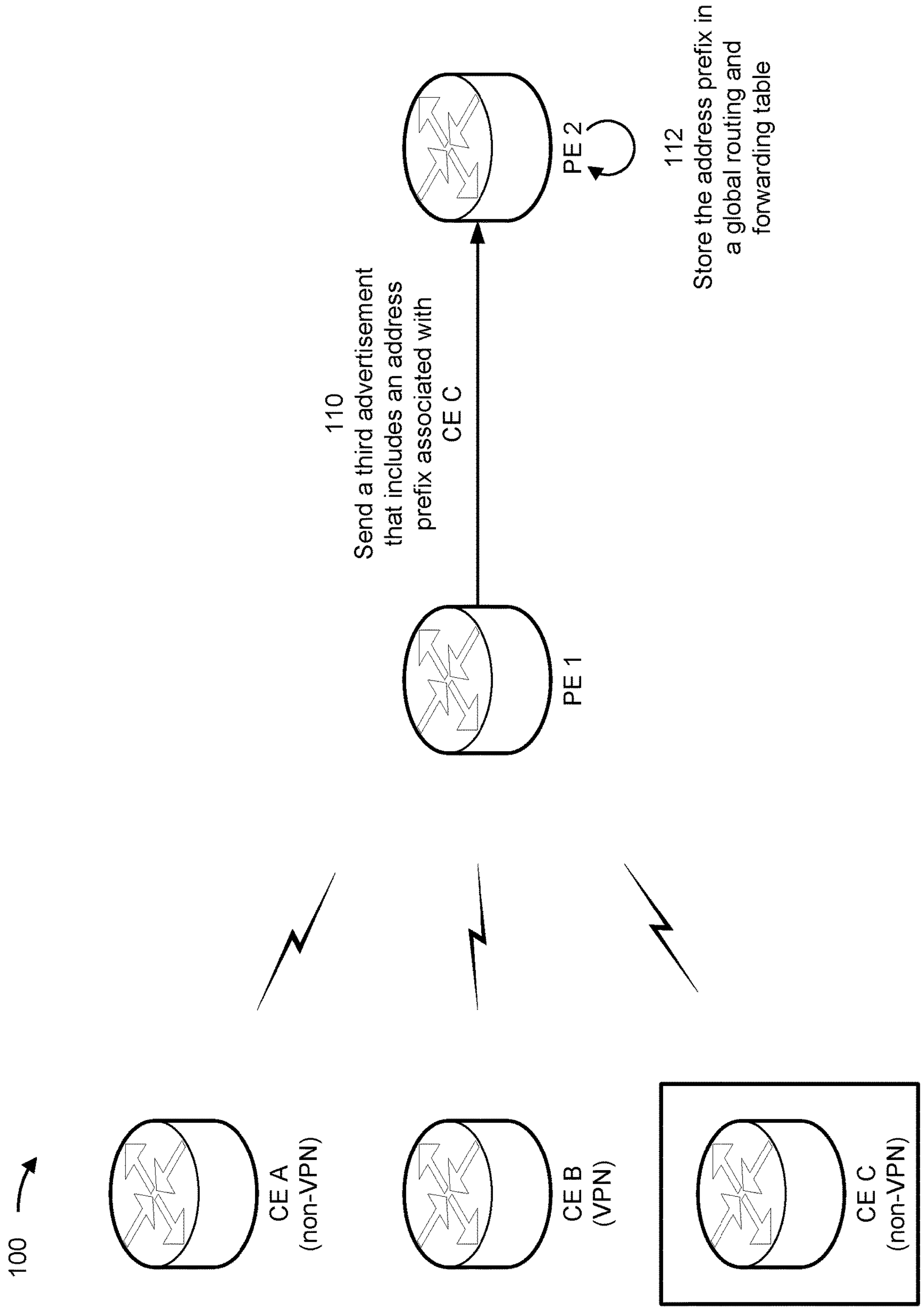

FIGS. 1A-1C are diagrams of one or more example implementations 100 described herein. As shown in FIGS. 1A-1C, example implementation(s) 100 may include a plurality of CE network devices (shown as CE network devices CE A, CE B, and CE C) and/or a plurality of PE network devices (shown as PE network devices PE 1 and PE 2) in a network, which are described in more detail below in connection with FIGS. 2-4. In some implementations, a particular CE network device may be associated with a VPN, or alternatively, may not be associated with a VPN. For example, as shown in FIGS. 1A-1C, each of the CE network devices CE A and CE C are not associated with a VPN and the CE B is associated with a VPN. A particular PE network device may be connected to one or more CE network devices, of the plurality of CE network devices, such that the particular PE network device may be termed an "ingress" PE network device associated with the one or more CE network devices. For example, as shown in FIGS. 1A-1C, the PE network device PE 1 may be connected to the CE network devices CE A, CE B, and CE C. Accordingly, the PE network device PE 1 may be configured to advertise routes associated with the network devices CE A, CE B, and CE C to other PE network devices (e.g., that may be termed "egress" PE network devices), such as PE network device PE 2, as described herein.

As shown in FIG. 1A, and by reference number 102, the PE network device PE 1 may generate and send a first advertisement (also referred to as a first advertisement message), such as to one or more other PE network devices of the plurality of PE network devices. This is also referred to as "advertising" the first advertisement. For example, the PE network device PE 1 may send the first advertisement to the PE network device PE 2 (e.g., according to a protocol, such as a border gateway protocol (BGP) or an interior gateway protocol (IGP)). In this way, the PE network device PE 2 may receive the first advertisement.

The first advertisement may be associated with a route of the CE network device CE A. For example, the first advertisement message may include an address prefix associated with the CE network device CE A. Accordingly, the address prefix may not be a VPN address prefix (e.g., because the CE network device CE A is not associated with a VPN).

The PE network device PE 1 may determine an RD and/or an RT associated with the address prefix and may additionally include the RD and/or the RT in the first advertisement. The RD may be a universally unique identifier (UUID), or another type of identifier, and/or may indicate that the address prefix is not a VPN address prefix. The RT may indicate that the address prefix is to be included in a global routing forwarding table (e.g., not a virtual routing and forwarding table associated with a VPN) of a PE network device that receives the first advertisement (e.g., of the PE network device PE 2, as shown in FIG. 1A). In some implementations, the PE network device PE 1 may additionally include a label in the first advertisement. For example, the label may be set to null (e.g., implicit null), or another value, to indicate that the first advertisement is not associated with a VPN. Alternatively, the label may include a non-null value, or another value, to enable a particular traffic forwarding functionality, such as a BGP labeled unicast (LU) functionality, of a PE network device that receives the first advertisement (e.g., the PE network device PE 2, as shown in FIG. 1A).

As shown by reference number 104, the PE network device PE 2 may store the address prefix of the first advertisement in a global routing and forwarding table of the PE network device PE 2 (e.g., that is, or is included in, a data structure of the PE network device PE 2). For example, the PE network device PE 2 may process (e.g., parse and/or read) the first advertisement to identify the address prefix, the RD, the RT, and/or the label included in the first advertisement. The PE network device PE 2 may determine, based on the RD and/or the RT, that the address prefix is not a VPN address prefix and/or that the address prefix is to be included in a global routing and forwarding table. The PE network device PE 2 may thereby determine that the address prefix is to be stored in the global routing and forwarding table of the PE network device PE 2. Accordingly, the PE network device PE 2 may store the address prefix in the global routing and forwarding table of the PE network device PE 2. In some implementations, the PE network device PE 2 may also store the RD, the RT, and/or the label with the address prefix in the global routing and forwarding table (e.g., in an entry of the global routing and forwarding table).

As shown in FIG. 1B, and by reference number 106, the PE network device PE 1 may generate and send a second advertisement (also referred to as a second advertisement message), such as to one or more other PE network devices of the plurality of PE network devices. This is also referred to as advertising the second advertisement. For example, the PE network device PE 1 may send the second advertisement to the PE network device PE 2 (e.g., according to a protocol, such as BGP or IGP). In this way, the PE network device PE 2 may receive the second advertisement.

The second advertisement may be associated with a route of the CE network device CE B. For example, the second advertisement message may include an address prefix associated with the CE network device CE B. Accordingly, the address prefix may be a VPN address prefix (e.g., because the CE network device CE B is associated with a VPN).

The PE network device PE 1 may determine an RD and/or an RT associated with the address prefix and may additionally include the RD and/or the RT in the second advertisement. The RD may be a UUID, or another type of identifier, and/or may indicate that the address prefix is a VPN address prefix. The RT may indicate that the address prefix is to be included in a virtual routing and forwarding table associated with a VPN (e.g., the VPN associated with the CE network device CE B) of a PE network device that receives the second advertisement (e.g., of the PE network device PE 2, as shown in FIG. 1A).

As shown by reference number 108, the PE network device PE 2 may store the address prefix of the second advertisement in a virtual routing and forwarding table of the PE network device PE 2 (e.g., that is, or is included in, a data structure of the PE network device PE 2). For example, the PE network device PE 2 may process (e.g., parse and/or read) the second advertisement to identify the address prefix, the RD, and/or the RT included in the second advertisement. The PE network device PE 2 may determine, based on the RD and/or the RT, that the address prefix is a VPN address prefix and/or that the address prefix is to be included in a virtual routing and forwarding table associated with a VPN (e.g., that is associated with the CE network device CE B). The PE network device PE 2 may thereby determine that the address prefix is to be stored in the virtual routing and forwarding table of the PE network device PE 2 that is associated with the VPN. Accordingly, the PE network device PE 2 may store the address prefix in the virtual routing and forwarding table. In some implementations, the PE network device PE 2 may also store the RD, and/or the RT with the address prefix in the virtual routing and forwarding table (e.g., in an entry of the virtual routing and forwarding table).

As shown in FIG. 1C, and by reference number 110, the PE network device PE 1 may generate and send a third advertisement (also referred to as a third advertisement message), such as to one or more other PE network devices of the plurality of PE network devices. This is also referred to as advertising the third advertisement. For example, the PE network device PE 1 may send the third advertisement to the PE network device PE 2 (e.g., according to a protocol, such as BGP or IGP). In this way, the PE network device PE 2 may receive the third advertisement.

The third advertisement may be associated with a route of the CE network device CE C. For example, the third advertisement message may include an address prefix associated with the CE network device CE C. Accordingly, the address prefix may not be a VPN address prefix (e.g., because the CE network device CE C is not associated with a VPN). In some implementations, the PE network device PE 1 may refrain from determining an RD and/or an RT associated with the address prefix. Accordingly, the PE network device PE 1 may refrain from including an RD and/or an RT in the third advertisement.

As shown by reference number 112, the PE network device PE 2 may store the address prefix of the third advertisement in the global routing and forwarding table of the PE network device PE 2. For example, the PE network device PE 2 may process (e.g., parse and/or read) the third advertisement to identify the address prefix included in the third advertisement. The PE network device PE 2 may determine, such as based on the third advertisement not including an RD and/or an RT, that the address prefix is not a VPN address prefix and/or that the address prefix is to be included in a global routing and forwarding table. The PE network device PE 2 may thereby determine that the address prefix is to be stored in the global routing and forwarding table of the PE network device PE 2. Accordingly, the PE network device PE 2 may store the address prefix in the global routing and forwarding table of the PE network device PE 2 (e.g., in an entry of the global routing and forwarding table).

As indicated above, FIGS. 1A-1C are provided merely as one or more examples. Other examples may differ from what is described with regard to FIGS. 1A-1C.

Figure 2:
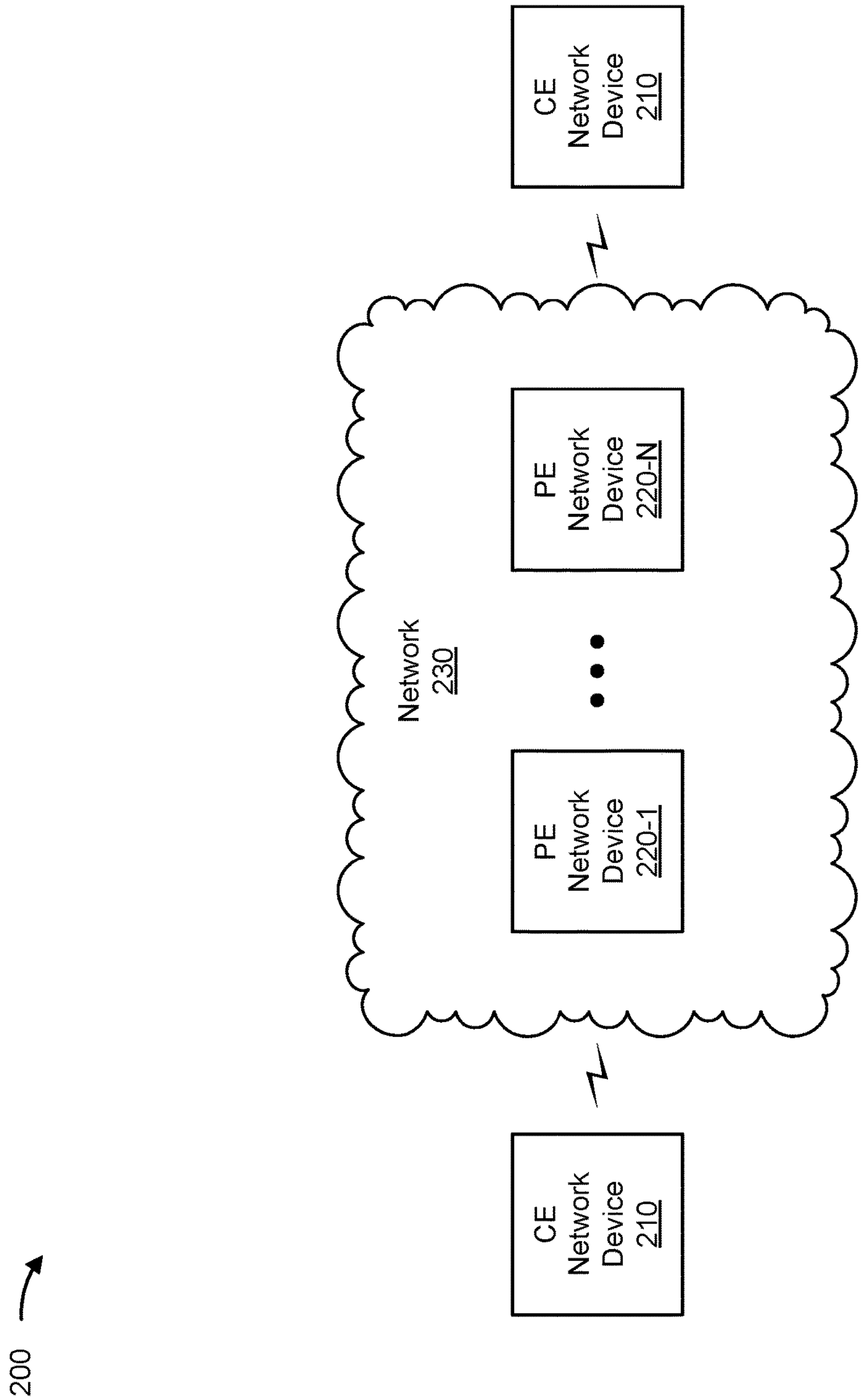
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include CE network devices 210, a plurality of PE network devices 220 (shown as PE devices 220-1 through 220-N), and a network 230. Devices of environment 200 may interconnect via wired connections, wireless connections, or a combination of wired and wireless connections.

A CE network device 210 includes one or more devices capable of generating, sending, receiving, processing, storing, routing, and/or providing traffic (e.g., VPN traffic and/or non-VPN traffic) in a manner described herein. For example, a CE network device 210 may include a firewall, a gateway, a switch, a hub, a bridge, a reverse proxy, a server (e.g., a proxy server), a security device, an intrusion detection device, a load balancer, or a similar type of device. Additionally, or alternatively, a CE network device 210 may include a router, such as a label switching router (LSR), a label edge router (LER), an ingress router, an egress router, a provider router (e.g., a provider edge router or a provider core router), a virtual router, or another type of router. In some implementations, a CE network device 210 may include a mobile phone (e.g., a smart phone or a radiotelephone), a laptop computer, a tablet computer, a desktop computer, a handheld computer, or a similar type of device. A CE network device 210 may be connected to a PE network device 220 via a link (e.g., an uplink) of the PE network device 220. In some implementations, a CE network device 210 may transmit traffic (e.g., VPN traffic and/or non-VPN traffic) to a PE network device 220 and receive traffic from the PE network device 220, as described elsewhere herein. A CE network device 210 may be a physical device implemented within a housing, such as a chassis. In some implementations, a CE network device 210 may be a virtual device implemented by one or more computer devices of a cloud computing environment or a data center.

A PE network device 220 includes one or more devices capable of receiving, processing, storing, routing, and/or providing traffic (e.g., VPN traffic and/or non-VPN traffic) in a manner described herein. For example, a PE network device 220 may include a firewall, a gateway, a switch, a hub, a bridge, a reverse proxy, a server (e.g., a proxy server), a security device, an intrusion detection device, a load balancer, or a similar type of device. Additionally, or alternatively, a PE network device 220 may include a router, such as an LSR, an LER, an ingress router, an egress router, a provider router (e.g., a provider edge router or a provider core router), a virtual router, or another type of router. In some implementations, a PE network device 220 may include a link that connects the PE network device 220 to a CE network device 210. In some implementations, the PE network device 220 may transmit traffic between the CE network device 210 and the network 230, as described elsewhere herein. APE network device 220 may be a physical device implemented within a housing, such as a chassis. In some implementations, a PE network device 220 may be a virtual device implemented by one or more computer devices of a cloud computing environment or a data center.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
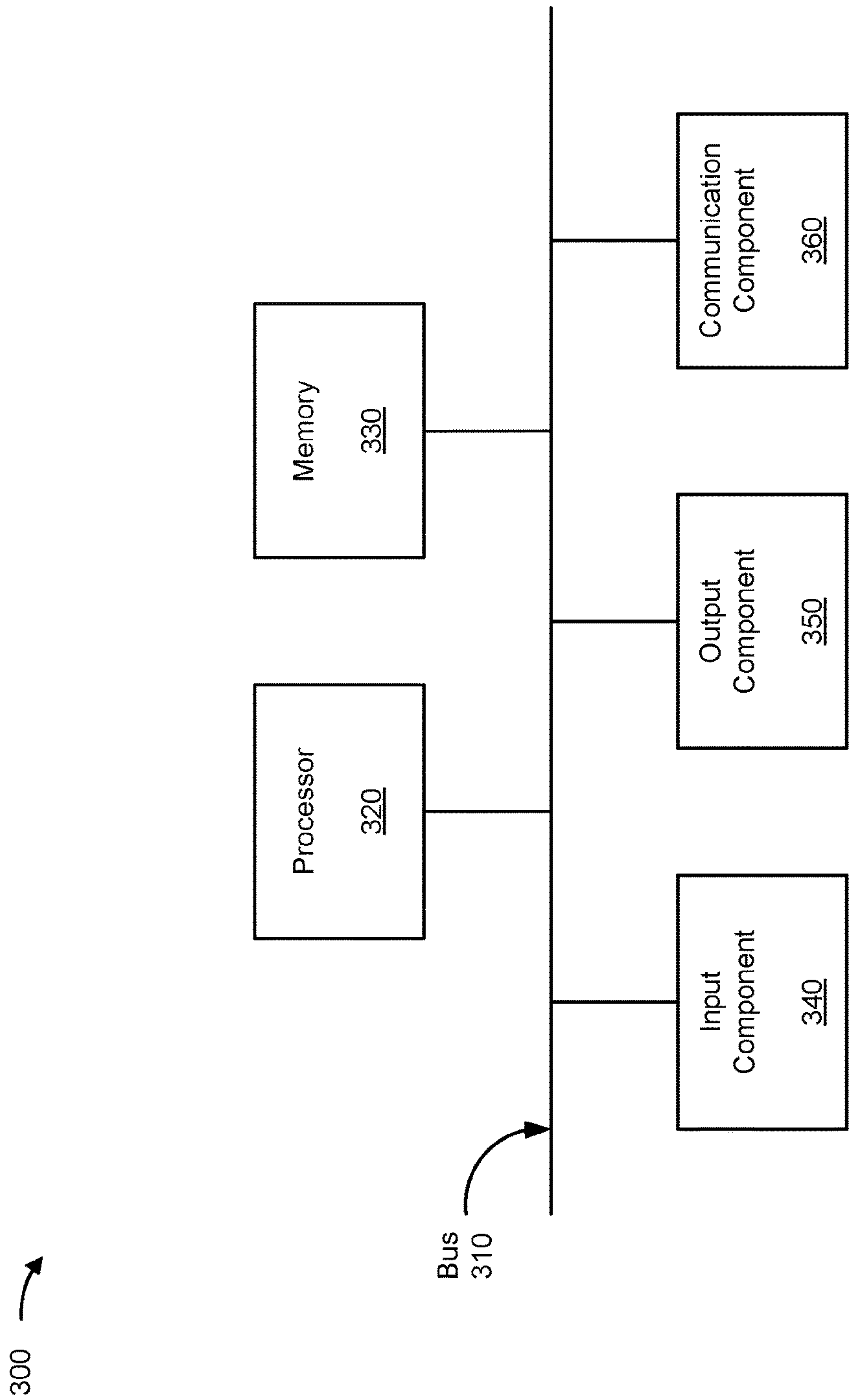
FIG. 3 is a diagram of example components of a device associated with advertising non-VPN routes with an RD and an RT.

FIG. 3 is a diagram of example components of a device 300 associated with advertising non-VPN routes with a route distinguisher and a route target. The device 300 may correspond to the CE network device 210 and/or the PE network device 220. In some implementations, the CE network device 210 and/or the PE network device 220 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
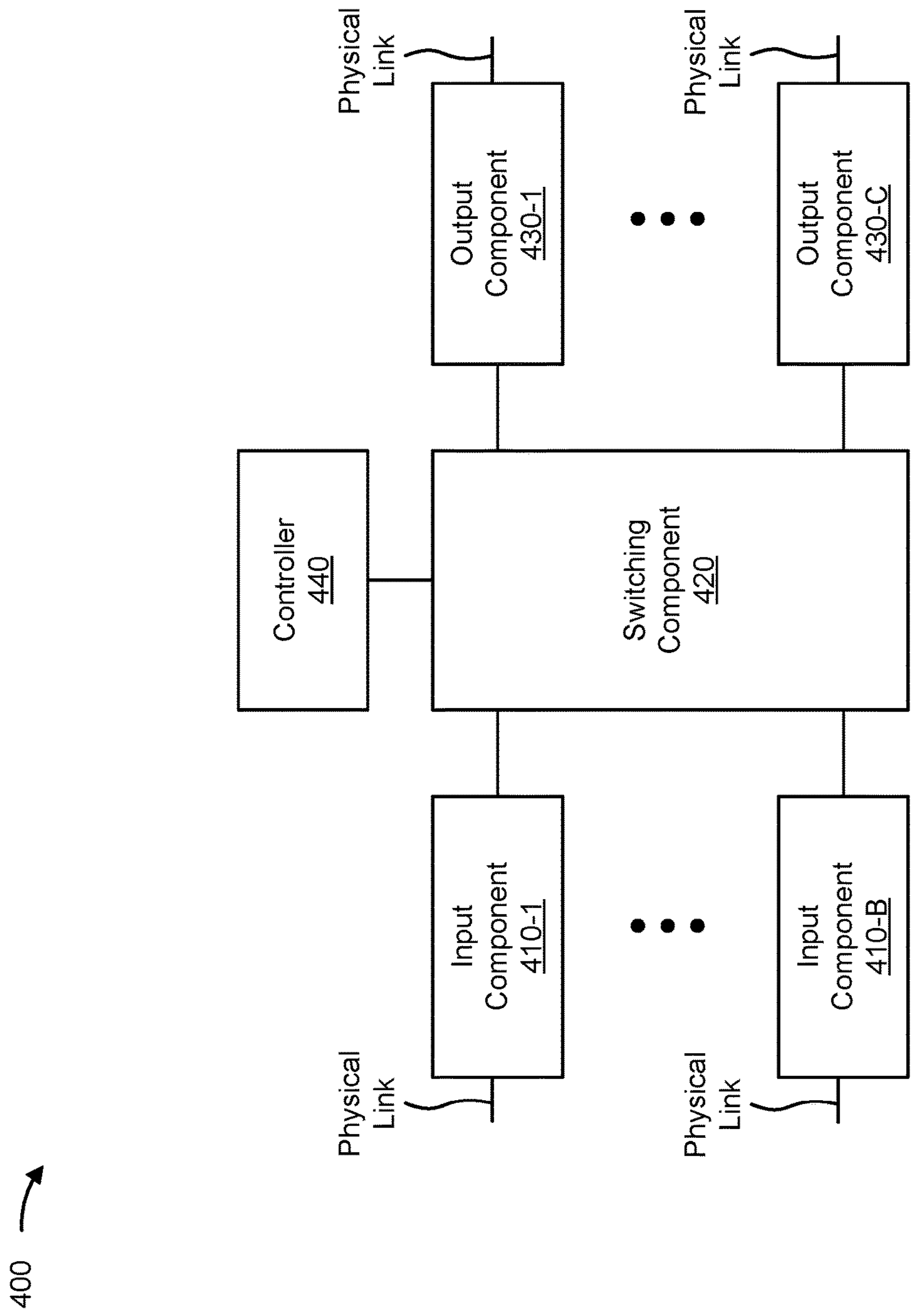
FIG. 4 is a diagram of example components of a device associated with advertising non-VPN routes with an RD and an RT.

FIG. 4 is a diagram of example components of a device 400 associated with advertising non-VPN routes with a route distinguisher and a route target. Device 400 may correspond to the CE network device 210 and/or the PE network device 220. In some implementations, the CE network device 210 and/or the PE network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
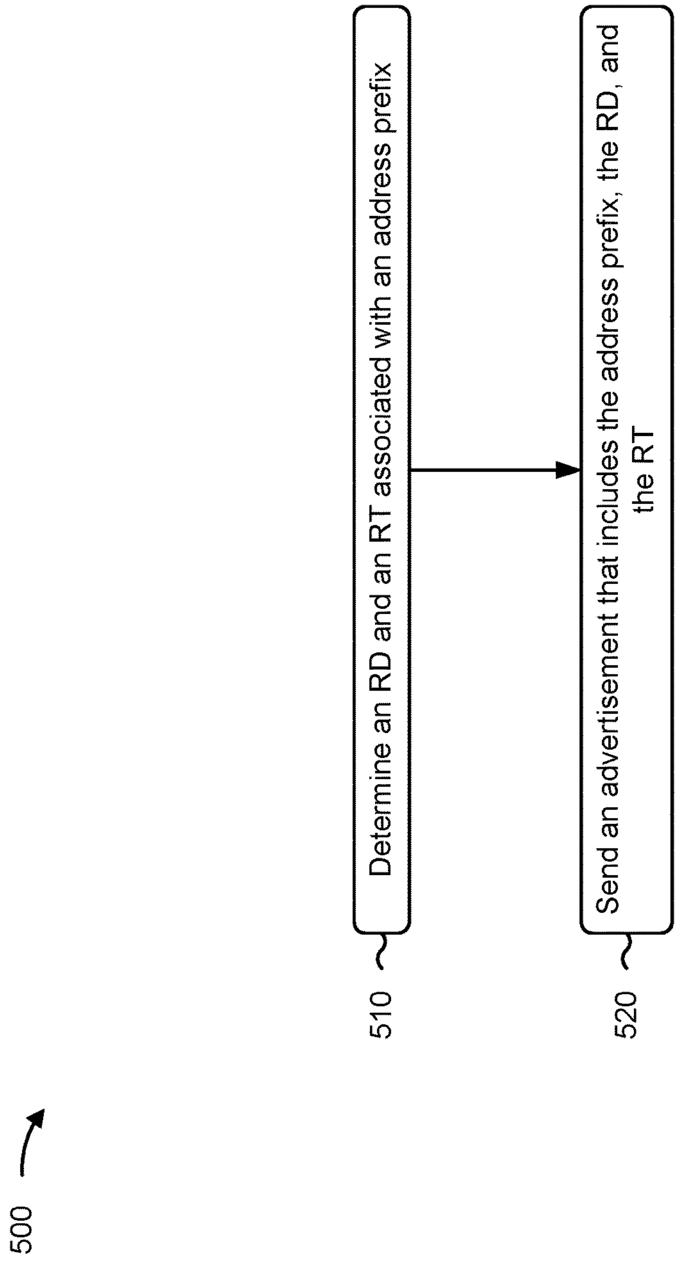
FIG. 5 is a flowchart of an example process associated with advertising non-VPN routes with an RD and an RT.

FIG. 5 is a flowchart of an example process 500 associated with advertising non-VPN routes with an RD and an RT. In some implementations, one or more process blocks of FIG. 5 are performed by a first network device (e.g., a PE network device 220). In some implementations, one or more process blocks of FIG. 5 are performed by another device or a group of devices separate from or including the first network device, such as one or more other network devices (e.g., a CE network device 210 and/or another PE network device 220). Additionally, or alternatively, one or more process blocks of FIG. 5 may be performed by one or more components of the device 300, such as the processor 320, the memory 330, the input component 340, the output component 350, and/or the communication component 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include determining an RD and an RT associated with an address prefix (block 510). For example, the first network device may determine an RD and an RT associated with an address prefix that that is to be included in a global routing and forwarding table, as described above.

As further shown in FIG. 5, process 500 may include sending an advertisement that includes the address prefix, the RD, and the RT (block 520). For example, the first network device may send an advertisement that includes the address prefix, the RD, and the RT, as described above. In some implementations, the RT indicates that the address prefix is to be included in a global routing and forwarding table of a receiving network device.

Process 500 may include additional implementations, such as any single implementation or any combination of implementations described below and/or in connection with one or more other processes described elsewhere herein.

In a first implementation, sending the advertisement is to permit the receiving network device to store, based on the RD and the RT, the address prefix in the global routing and forwarding table of the receiving network device.

In a second implementation, alone or in combination with the first implementation, the advertisement further includes a label.

In a third implementation, alone or in combination with one or more of the first and second implementations, process 500 includes sending, to the receiving network device, another advertisement that includes another address prefix, another RD, and another RT, wherein the other RT indicates that the other address prefix is to be included a virtual routing and forwarding table of the receiving network device.

In a fourth implementation, alone or in combination with one or more of the first through third implementations, sending the other advertisement is to permit the receiving network device to store, based on the other RD and the other RT, the other address prefix in the virtual routing and forwarding table of the receiving network device.

In a fifth implementation, alone or in combination with one or more of the first through fourth implementations, process 500 includes sending, to the receiving network device, another advertisement that includes another address prefix, wherein the other advertisement does not include an RD and does not include an RT.

In a sixth implementation, alone or in combination with one or more of the first through fifth implementations, sending the other advertisement is to permit the receiving network device to store, based on the other advertisement, the other address prefix in the global routing and forwarding table of the third network device.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
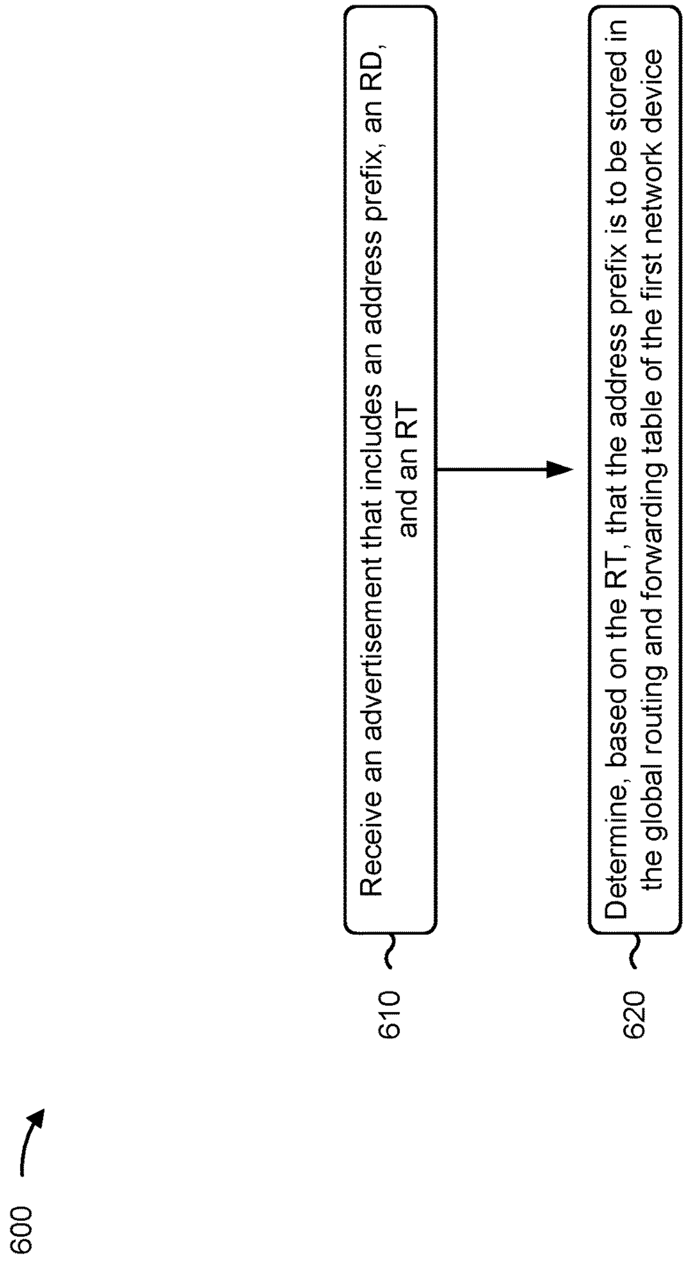
FIG. 6 is a flowchart of an example process associated with advertising non-VPN routes with an RD and an RT.

FIG. 6 is a flowchart of an example process 600 associated with advertising non-VPN routes with a route distinguisher and a route target. In some implementations, one or more process blocks of FIG. 6 are performed by a network device (e.g., a PE network device 220). In some implementations, one or more process blocks of FIG. 6 are performed by another device or a group of devices separate from or including the network device, such as one or more other network devices (e.g., a CE network device 210 and/or another PE network device 220). Additionally, or alternatively, one or more process blocks of FIG. 6 may be performed by one or more components of the device 300, such as the processor 320, the memory 330, the input component 340, the output component 350, and/or the communication component 360. Additionally, or alternatively, one or more process blocks of FIG. 6 may be performed by one or more components of the device 400, such as the input component 410, the switching component 420, the output component 430, and/or the controller 440.

As shown in FIG. 6, process 600 may include receiving an advertisement that includes an address prefix, an RD, and an RT (block 610). For example, the network device may receive an advertisement that includes an address prefix, an RD, and an RT, as described above. In some implementations, the RT indicates that the address prefix is to be included in a global routing and forwarding table of the network device.

As further shown in FIG. 6, process 600 may include determining, based on the RT, that the address prefix is to be stored in the global routing and forwarding table of the network device (block 620). For example, the network device may determine, based on the RT, that the address prefix is to be stored in the global routing and forwarding table of the network device, as described above.

Process 600 may include additional implementations, such as any single implementation or any combination of implementations described below and/or in connection with one or more other processes described elsewhere herein.

In a first implementation, process 600 includes storing, based on determining that the address prefix is to be stored, the address prefix in the global routing and forwarding table of the network device.

In a second implementation, alone or in combination with the first implementation, the advertisement further includes a label.

In a third implementation, alone or in combination with one or more of the first and second implementations, process 600 includes receiving another advertisement that includes another address prefix, another RD, and another RT, wherein the other RT indicates that the other address prefix is to be included a virtual routing and forwarding table of the network device.

In a fourth implementation, alone or in combination with one or more of the first through third implementations, process 600 includes storing, based on the other RT, the other address prefix, in the virtual routing and forwarding table of the network device.

In a fifth implementation, alone or in combination with one or more of the first through fourth implementations, process 600 includes receiving another advertisement that includes another address prefix, wherein the other advertisement does not include an RD and does not include an RT.

In a sixth implementation, alone or in combination with one or more of the first through fifth implementations, process 600 includes storing the other address prefix in the global routing and forwarding table of the network device.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

determining, by a first network device, a route distinguisher (RD) and a route target (RT) associated with an address prefix that is to be included in a global routing and forwarding table, wherein the RD is a universally unique identifier, and wherein the address prefix is a non-virtual private network (non-VPN) address prefix associated with a non-VPN edge network device; and sending, by the first network device, an advertisement that includes the address prefix, the RD, and the RT, wherein the advertisement is a border gateway protocol (BGP) advertisement message or an interior gateway protocol (IGP) advertisement message, and wherein:

the RD indicates that the address prefix is a non-VPN address prefix, and the RT indicates that the address prefix is to be included in a global routing and forwarding table of a receiving network device.

2. The method of claim 1, wherein sending the advertisement is to permit the receiving network device to store, based on the RT, the address prefix in the global routing and forwarding table of the receiving network device.

3. The method of claim 1, wherein the advertisement further includes a label.

4. The method of claim 1, further comprising:

sending, to the receiving network device, another advertisement that includes another address prefix, another RD, and another RT, wherein:

the other RT indicates that the other address prefix is to be included in a virtual routing and forwarding table of the receiving network device.

5. The method of claim 4, wherein sending the other advertisement is to permit the receiving network device to store, based on the other RT, the other address prefix in the virtual routing and forwarding table of the receiving network device.

6. The method of claim 1, further comprising:

sending, to the receiving network device, another advertisement that includes another address prefix, wherein:

the other advertisement does not include an RD and does not include an RT.

7. The method of claim 6, wherein sending the other advertisement is to permit the receiving network device to store the other address prefix in the global routing and forwarding table of the receiving network device.

8. A non-transitory computer-readable medium storing a set of instructions, the set of instructions comprising:

one or more instructions that, when executed by one or more processors of a network device, cause the network device to:

receive an advertisement that includes an address prefix, a route distinguisher (RD), and a route target (RT), wherein the RD is a universally unique identifier, wherein the advertisement is a border gateway protocol (BGP) advertisement message or an interior gateway protocol (IGP) advertisement message, and wherein:

the RD indicates that the address prefix is a non-virtual private network (non-VPN) address prefix associated with a non-VPN edge network device, and the RT indicates that the address prefix is to be included in a global routing and forwarding table of the network device; and determine, based on the RD and the RT, that the address prefix is to be stored in the global routing and forwarding table of the network device.

9. The non-transitory computer-readable medium of claim 8, wherein the one or more instructions further cause the network device to:

store, based on determining that the address prefix is to be stored, the address prefix in the global routing and forwarding table of the network device.

10. The non-transitory computer-readable medium of claim 8, wherein the advertisement further includes a label.

11. The non-transitory computer-readable medium of claim 8, wherein the one or more instructions further cause the network device to:

receive another advertisement that includes another address prefix, another RD, and another RT, wherein:

the other RT indicates that the other address prefix is to be included a virtual routing and forwarding table of the network device.

12. The non-transitory computer-readable medium of claim 11, wherein the one or more instructions further cause the network device to:

store, based on the other RT, the other address prefix in the virtual routing and forwarding table of the network device.

13. The non-transitory computer-readable medium of claim 8, wherein the one or more instructions further cause the network device to:

receive another advertisement that includes another address prefix, wherein:

the other advertisement does not include an RD and does not include an RT.

14. The non-transitory computer-readable medium of claim 13, wherein the one or more instructions further cause the network device to:

store the other address prefix in the global routing and forwarding table of the network device.

15. A first network device, comprising:

one or more memories; and one or more processors to:

send, to a second network device, an advertisement that includes a route distinguisher (RD) and a route target (RT), wherein the RD is a universally unique identifier, and wherein the advertisement is a border gateway protocol (BGP) advertisement message or an interior gateway protocol (IGP) advertisement message, and wherein:

the RT indicates that an address prefix of the advertisement is to be included in a global routing and forwarding table of the second network device, and the RD indicates that the address prefix is a non-virtual private network (non-VPN) address prefix associated with a non-VPN edge network device.

16. The first network device of claim 15, wherein sending the advertisement is to permit the second network device to store, based on the RT, the address prefix in the global routing and forwarding table of the second network device.

17. The first network device of claim 15, wherein the one or more processors are further to:

send, to the second network device, another advertisement that includes another RD and another RT, wherein:

the other RT indicates that another address prefix of the other advertisement is to be included in a virtual routing and forwarding table of the second network device.

18. The first network device of claim 17, wherein sending the other advertisement is to permit the second network device to store, based on the other RT, the other address prefix in the virtual routing and forwarding table of the second network device.

19. The first network device of claim 15, wherein the one or more processors are further to:

send another advertisement that does not include an RD and does not include an RT.

20. The first network device of claim 19, wherein sending the other advertisement is to permit the second network device to store another address prefix of the other advertisement in the global routing and forwarding table of the second network device.

* * * * *